(12) United States Patent
Galvin

(10) Patent No.: US 11,066,312 B2
(45) Date of Patent: *Jul. 20, 2021

(54) METHOD AND APPARATUS FOR SEPARATING LOW DENSITY PARTICLES FROM FEED SLURRIES

(75) Inventor: Kevin Patrick Galvin, Callaghan (AU)

(73) Assignee: NEWCASTLE INNOVATION LIMITED, Callaghan (AU)

( * ) Notice: Subject to any disclaimer, the term of this patent is extended or adjusted under 35 U.S.C. 154(b) by 214 days.

This patent is subject to a terminal disclaimer.

(21) Appl. No.: 13/701,668

(22) PCT Filed: Jun. 2, 2011

(86) PCT No.: PCT/AU2011/000682
§ 371 (c)(1),
(2), (4) Date: Dec. 3, 2012

(87) PCT Pub. No.: WO2011/150455
PCT Pub. Date: Dec. 8, 2011

(65) Prior Publication Data
US 2013/0200004 A1 Aug. 8, 2013

(30) Foreign Application Priority Data

Jun. 3, 2010 (AU) .................... 2010902439

(51) Int. Cl.
*C02F 1/24* (2006.01)
*B03B 5/00* (2006.01)
(Continued)

(52) U.S. Cl.
CPC .................. *C02F 1/24* (2013.01); *B03B 5/00* (2013.01); *B03B 5/32* (2013.01); *B03B 5/62* (2013.01);
(Continued)

(58) Field of Classification Search
CPC .. B03D 1/1412; B03D 1/1456; B03D 1/1462; B03D 1/24; B03D 1/1431; B03D 1/1493;
(Continued)

(56) References Cited

U.S. PATENT DOCUMENTS 3,351,199 A * 11/1967 Zvejnieks ..................... 209/170
3,371,779 A * 3/1968 Hollingsworth ...... B01F 5/0212
209/166

(Continued)

FOREIGN PATENT DOCUMENTS

CN    1390632    1/2003
CN    1724418    1/2006
(Continued)

OTHER PUBLICATIONS

Manivasagan et al., Optimization studies in an Inverse Fluidized Bed Bioreactor for Starch Wastewater Treatment, Sep. 2009, p. 1.*
(Continued)

*Primary Examiner* — Bobby Ramdhanie
*Assistant Examiner* — Donovan Bui-Huynh
(74) *Attorney, Agent, or Firm* — Brooks Kushman P.C.

(57) ABSTRACT

In a method and apparatus for separating low density particles from feed slurries, a bubbly mixture is formed in a downcomer and issues into a mid region in a chamber. An inverted reflux classifier is formed by parallel inclined plates below the mid region allowing for efficient separation of low density particles which rise up to form a densely packed foam in the top of the chamber, and denser particles which fall downwardly to an outlet.

41 Claims, 4 Drawing Sheets

(51) Int. Cl.
| | |
|---|---|
| *B03D 1/24* | (2006.01) |
| *B03D 1/14* | (2006.01) |
| *B03B 5/62* | (2006.01) |
| *C02F 3/08* | (2006.01) |
| *B03B 5/32* | (2006.01) |
| *B04B 1/04* | (2006.01) |
| *B04B 1/00* | (2006.01) |

(52) U.S. Cl.
CPC ......... *B03D 1/1418* (2013.01); *B03D 1/1481* (2013.01); *B03D 1/242* (2013.01); *B03D 1/245* (2013.01); *B04B 1/00* (2013.01); *B04B 1/04* (2013.01)

(58) Field of Classification Search
CPC ...... B03D 1/245; B03D 1/028; B03D 1/1406; B03D 1/1418; B03D 1/082; B03D 1/26; B03D 1/1481; B03D 1/247; B03D 1/1475; B03D 1/16; B03D 1/1468; B03D 1/242; B03D 1/02; B03D 1/025; B03D 1/08; B03D 1/085; B03D 1/1487; B03D 1/18; B03D 1/20; B03D 2203/02; B03D 2203/08; B03D 3/00; B01D 21/0045; B01D 21/10; B01D 21/2427; B01D 17/00; B01D 17/0211; B01D 17/0214; B01D 17/0217; B01D 17/047; B01D 21/0039; B01D 21/2405; B01D 21/2411; B01D 21/2416; B01D 21/2433; B01D 21/2444; B01D 17/0208; B01D 21/245; B01D 21/2488; B01D 21/30; B01D 21/00; B01D 21/0042; B01D 21/0048; B01D 21/0057; B01D 21/0063; B01D 21/0069; B01D 21/0087; B01D 21/009; B01D 21/01; B01D 21/02; B01D 21/08; B01D 21/34; B01D 2221/04; B01D 17/0205; B01D 17/042; B01D 17/045; B01D 17/048; B01D 19/00; B01D 19/0042; B01D 19/0047; B01D 19/0057; B01D 19/02; B01D 21/0003; B01D 21/0018; B01D 21/0051; B01D 21/0075; B01D 21/26; B01D 21/267; B01D 21/283; B01D 21/32; B01D 36/04; B01D 45/16; B01D 47/00; B01D 53/52; B01D 53/83; B01D 9/005; C02F 1/24; C02F 1/38; C02F 1/72; C02F 1/78; C02F 3/20; C02F 3/2873; C02F 11/18; C02F 1/001; C02F 1/048; C02F 1/20; C02F 1/385; C02F 1/40; C02F 1/463; C02F 1/52; C02F 1/76; C02F 2001/007; C02F 2101/16; C02F 2101/163; C02F 2101/166; C02F 2101/20; C02F 2103/22; C02F 2209/005; C02F 2301/002; C02F 2301/024; C02F 2301/026; C02F 2303/12; C02F 3/006; C02F 3/085; C02F 3/22; C02F 3/223; C02F 3/226; C02F 3/26; C02F 3/2846; C02F 3/301; C02F 9/00; B03B 5/623; B03B 5/62; B03B 5/66; B03B 1/00; B03B 5/00; B03B 5/02; B03B 5/28; B03B 5/32; B03B 9/00; C04B 18/08; C04B 28/02; C04B 14/06; C04B 20/02; Y02W 10/10; Y02W 10/15; Y02W 30/64; Y02W 30/646; Y02W 10/33; Y02W 30/91; Y02W 30/92; B01J 8/22; B01J 8/34; B01J 8/44; B01J 2208/0069; B01J 2208/00725; B01J 8/1818; B01J 8/1827; Y10S 261/75; Y10S 209/902; Y10S 210/05; B01F 2003/04319; B01F 2003/0439; B01F 2003/04858; B01F 3/0446; B01F 15/0272; B01F 2215/0431; B01F 3/04099; B01F 3/04106; B01F 3/04262; B01F 5/0068; B01F 5/0071; B01F 5/0212; B01F 5/0408; B01F 5/0453; B01F 5/0456; B01F 5/0476; B01F 5/0617; B04B 1/00; B04B 11/06; B04B 15/06; B04B 1/04; B04B 5/02; D21B 1/327; A01K 63/04; A01K 63/042; B04C 2009/002; B04C 3/00; B04C 3/06; B04C 5/06; B04C 5/10; B04C 5/103; B04C 5/13; B04C 5/14; B04C 5/28; B04C 9/00; B08B 17/02; C01B 17/0408; C01B 17/508; C01B 17/74; C10J 3/00; C10J 3/54; C10J 3/56; C10J 3/84; C10K 1/004; C10K 1/026; C10K 1/30; C12M 21/04; C12M 23/34; C12M 23/36; C12M 29/00; C12M 47/02; D21F 1/70; E21B 43/34; E21B 43/36; Y02E 20/18; Y10T 137/2076; Y10T 137/8593
See application file for complete search history.

(56) References Cited

U.S. PATENT DOCUMENTS

| | | | | |
|---|---|---|---|---|
| 3,451,550 | A * | 6/1969 | Cox | B04B 5/02 |
| | | | | 210/781 |
| 3,669,883 | A * | 6/1972 | Huckstedt | A01K 63/04 |
| | | | | 210/703 |
| 3,775,301 | A * | 11/1973 | McWhirter | B01J 23/6567 |
| | | | | 208/139 |
| 3,953,332 | A | 4/1976 | Speth et al. | |
| 4,431,531 | A * | 2/1984 | Hollingsworth | 209/170 |
| 4,855,065 | A * | 8/1989 | Keeter | B01D 17/00 |
| | | | | 210/776 |
| 4,883,603 | A | 11/1989 | Roggenstein et al. | |
| 4,964,576 | A | 10/1990 | Datta | |
| 5,167,375 | A | 12/1992 | Datta | |
| 5,234,112 | A * | 8/1993 | Valenzuela et al. | 209/169 |
| 5,447,702 | A * | 9/1995 | Campbell | B01D 53/52 |
| | | | | 423/230 |
| 5,511,669 | A * | 4/1996 | Bourke | 209/164 |
| 5,914,034 | A * | 6/1999 | Ding | B03D 1/1418 |
| | | | | 209/169 |
| 5,947,299 | A | 9/1999 | Vazquez et al. | |
| 6,059,118 | A * | 5/2000 | Ding et al. | 209/164 |
| 6,814,241 | B1 * | 11/2004 | Galvin | B01J 8/22 |
| | | | | 209/158 |
| 2007/0017874 | A1 * | 1/2007 | Renaud | C02F 1/20 |
| | | | | 210/703 |
| 2007/0278144 | A1 * | 12/2007 | Wong | 210/221.2 |
| 2008/0193340 | A1 * | 8/2008 | Cocco | B01J 8/1818 |
| | | | | 422/143 |
| 2008/0308502 | A1 * | 12/2008 | Jameson | B03D 1/02 |
| | | | | 210/703 |
| 2009/0288995 | A1 * | 11/2009 | Lambert | 209/169 |
| 2010/0116746 | A1 * | 5/2010 | Pfeffer | B01D 15/02 |
| | | | | 210/661 |
| 2011/0062090 | A1 * | 3/2011 | Bara et al. | 210/801 |
| 2011/0236274 | A1 * | 9/2011 | Buchmueller | C02F 3/006 |
| | | | | 422/187 |
| 2012/0006744 | A1 * | 1/2012 | Phattaranawik | C02F 3/301 |
| | | | | 210/605 |
| 2012/0111436 | A1 * | 5/2012 | Matsufuji | B03D 1/1418 |
| | | | | 137/806 |

FOREIGN PATENT DOCUMENTS

| | | |
|---|---|---|
| GB | 2211114 | 6/1989 |
| WO | 8604270 | 7/1986 |

(56) References Cited

FOREIGN PATENT DOCUMENTS

| | | |
|---|---|---|
| WO | 0045959 | 8/2000 |
| WO | 2006134235 | 12/2006 |
| WO | 2008064406 | 6/2008 |
| WO | 2011150455 | 12/2011 |

OTHER PUBLICATIONS

International Search Report for PCT/AU2011/000682, Completed by the Australian Patent Office dated Aug. 5, 2011, 5 Pages.
Escudie et al. The Canadian Journal of Chemical Engineering Feb. 2007, vol. 85, pp. 25-35, "Layer Inversion and Bed Contraction in Down-Flow Binary-Solid Liquid-Fluidized Beds".
Extended European Search Report for European Application No. EP 11788973.3, Completed by the European Patent Office, dated Sep. 15, 2017, 9 Pages.

\* cited by examiner

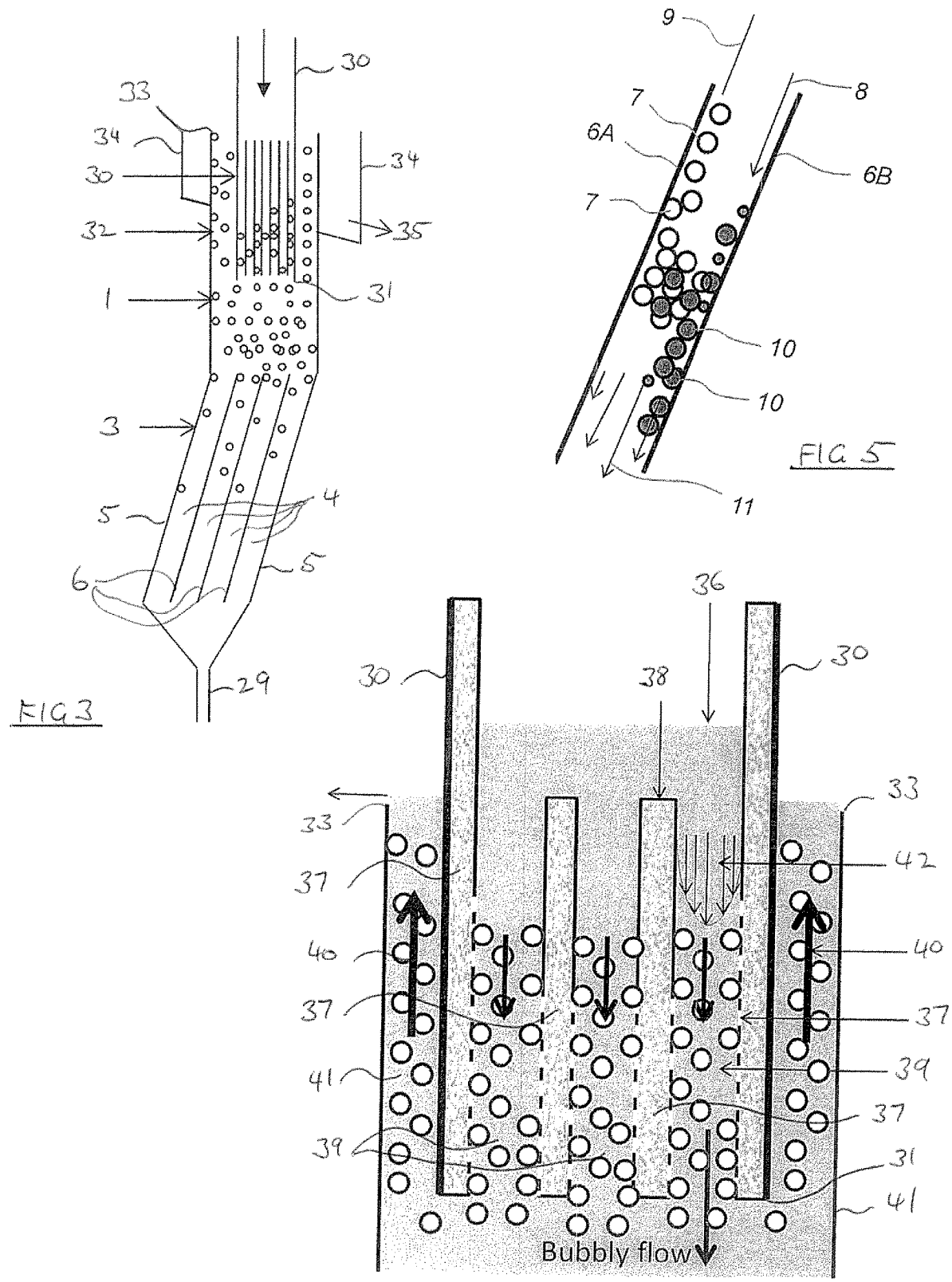

METHOD AND APPARATUS FOR SEPARATING LOW DENSITY PARTICLES FROM FEED SLURRIES

CROSS-REFERENCE TO RELATED APPLICATION

This application is the U.S. national phase of PCT Appln. No. PCT/AU2011/000682 filed on Jun. 2, 2011, which claims priority to Australian Patent Application No. 2010902439 filed on Jun. 3, 2010, the disclosures of which are incorporated in their entirety by reference herein.

FIELD OF THE INVENTION

This invention relates to a method and apparatus for separating low density particles from feed slurries containing such particles and has been devised particularly though not solely as an enhanced process of froth flotation as applied to fine coal or fine minerals used to concentrate hydrophobic particles.

Throughout this specification the term "low density particles" is used to refer to particles that may be solid-like, liquid-like, or gas-like, and in all cases less dense than the surrounding fluid which may for example be water. More specific examples of low density particles may include oil drops or even gas bubbles.

BACKGROUND OF THE INVENTION

It has been proposed in the past to separate low density particles from a feed slurry by introducing the feed above a set of parallel inclined channels where ideally the vast majority of the slurry is transported down through the inclined channels. The low density particles then escape the flow, rising towards the downward facing inclined surfaces of the channels, collecting as an inverted sediment and then sliding up the inclined channels. By this means, the low density particles concentrate on the top half of the device and in turn report to the overflow. This method and apparatus is described in the International Patent Application Number PCT/AU2007/001817 entitled "Method of Operating an Inclined Plate Classifier" with specific reference to FIG. 5 of that specification. It is there described how low density particles and a portion of the slurry report to the overflow via an overflow launder while wash water is added at the top and allowed to flow downwards in order to remove possible contaminants. The arrangement of parallel plates forming inclined channels in the inclined plate classifier has often been referred to as a "reflux classifier".

The present invention aims to improve on the operation of a reflux classifier for the separation of low density particles by fully inverting the reflux classifier and providing an upper fluidisation chamber at the top end of the device.

SUMMARY OF THE INVENTION

Accordingly, in one aspect, the present invention provides a method of separating low density particles from feed slurries containing such particles, said method comprising the steps of:

introducing the feed slurry into a chamber having a substantially enclosed upper end and a plurality of inclined surfaces in the lower end;

allowing the slurry to flow downwardly between the inclined surfaces such that the low density particles escape the flow by sliding up lower faces of the inclined surfaces while the denser particles in the slurry slide down upper faces of the inclined surfaces;

removing the denser particles from the lower end of the chamber;

forming an inverted fluidised bed in the chamber above the plurality of inclined surfaces;

allowing the low density particles to form into a concentrated suspension at the upper end of the chamber; and removing the concentrated suspension of low density particles at a controlled rate from the upper end of the chamber.

Preferably the plurality of inclined surfaces are arranged to form a set of parallel inclined channels.

Preferably wash water is introduced under pressure into the upper end of the chamber.

Preferably the wash water is introduced uniformly through the enclosed upper end of the chamber.

Preferably, the concentrated suspension of low density particles is guided to an exit point in the upper end of the chamber where it is removed at the controlled rate by the operation of an upper valve.

Preferably the denser particles are removed from the lower end of the chamber at a controlled rate by the operation of a lower valve or pump.

Preferably the operation of the upper valve and the lower valve or pump are controlled by measuring the suspension density in the upper part of the chamber and operating the valves and/or pump to keep the depth of low density particles within a predetermined range in the upper end of the chamber.

In one form of the invention, additional fluidisation is provided below the inclined channels.

In a further aspect, the present invention provides an apparatus for separating low density particles from feed slurries, said apparatus comprising:

a chamber having a substantially enclosed upper end and a plurality of inclined surfaces in the lower end;

feed means arranged to feed slurry into the chamber;

upper control means arranged to allow concentrated suspensions of low density particles to be removed from the upper end of the chamber at a controlled rate; and lower control means arranged to allow denser particles to be removed from the lower end of the chamber below the inclined surfaces at a controlled rate.

Preferably the substantially enclosed upper end of the chamber is shaped to direct the concentrated suspensions of low density particles toward the upper control means.

More preferably the upper end of the chamber is shaped as a cone with the upper control means provided in the form of an upper valve located at the apex of the cone.

Preferably the lower control means is provided in the form of a lower valve or a pump.

Preferably the control means are operable by measuring the depth of low density particles in the upper part of the chamber and opening or closing the upper and lower valves and/or operating the pump to keep the depth of low density particles within a predetermined range.

Preferably the upper end of the chamber is perforated and wash water feed means are provided arranged to introduce wash water under pressure into the chamber through the perforations.

Preferably the plurality of inclined surfaces are arranged to form a set of parallel inclined channels.

Preferably the set of parallel inclined channels are formed by an array of parallel inclined plates.

Yet another aspect of the invention provides a method of separating low density particles from feed slurries containing such particles, said method comprising the steps of:

introducing the feed slurry downwardly through a feed box into a chamber having plurality of inclined surfaces in the lower end;

allowing the slurry to flow downwardly through the inclined channels such that the low density particles escape the flow by sliding up the inclined channels while the denser particles in the slurry slide down the channels;

removing the denser particles from the lower end of the chamber;

forming an inverted fluidised bed in the chamber above the set of parallel inclined channels; and allowing the low density particles to move upwardly at a controlled rate through one or more confined passages between the outer walls of the feed box and the walls of the chamber to an overflow launder.

Preferably, the feed box incorporates a plurality of closely spaced parallel plates between which the feed slurry is fed, each plate having a porous sparger surface through which low density particles are passed into channels between the plates forming a bubbly mixture or emulsion, which issues from the lower end of the feed box. In one preferred form, the sparger generates or forms the low density particles from a fluid such as a gas to produce air bubbles. In another preferred form, a sparger type structure, such as a membrane, may be used to form drops from a low density liquid. In a further preferred form, the sparger type structure may involve a paste-like solid that is forced through the porous material.

Preferably, the porous plates in the feed box are sufficiently closely spaced to form a laminar flow profile between the plates inducing a high shear rate into the bubbly flow.

Preferably, the outer surfaces of the feed box are sufficiently closely spaced to the upper casing of the chamber so as to cause restricted upward movement of the low density particles to the overflow resulting in fast entrainment of low density particles.

BRIEF DESCRIPTION OF THE DRAWINGS

Notwithstanding any other forms that may fall within its scope, one preferred form of the invention will now be described by way of example only with reference to the accompanying drawings in which:

FIG. 3 is a diagrammatic cross-sectional elevation of an alternative form of apparatus for separating low density particles from feed slurries according to the invention;

FIG. 4 is an enlarged view of the bubbly flow generator shown in FIG. 3;

FIG. 5 is an enlarged diagrammatic vertical cross-section through one of the parallel inclined channels of the apparatus shown in FIG. 1, demonstrating particle movement within that channel.

DETAILED DESCRIPTION OF THE INVENTION

Figure 1:
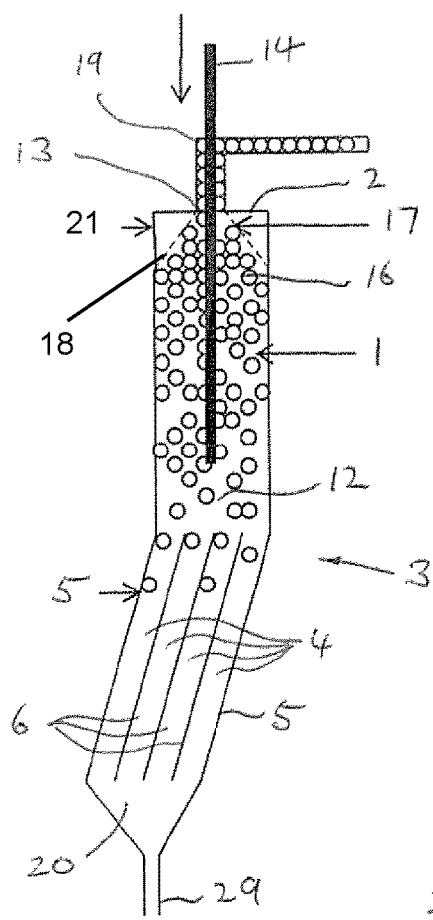
FIG. 1 is a diagrammatic cross-sectional elevation through apparatus for separating low density particles from feed slurries according to the invention.

The preferred form of the invention will be described with the method and apparatus being used for froth flotation, as typically applied to fine particles of coal and mineral matter and used to concentrate hydrophobic particles of coal.

These hydrophobic particles selectively adhere to the surface of air bubbles, leaving hydrophilic particles in suspension between the bubbles. Thus once the hydrophobic particles become attached to the air bubbles a new hybrid particle is formed which is of an overall density much less than the density of the water. The attached hydrophobic particle then has a segregation velocity in the upwards direction which is very high compared to the downward superficial velocity of the suspension of denser particles.

In most flotation situations certain reagents need to be added to promote flotation. A collector may be added to promote the hydrophobicity of the hydrophobic coal particles. In particular, a surfactant (sometimes called a "frother") is added to stabilise the bubbles and hence the foam formed as the bubbles seek to exit the bulk liquid. Surfactant adsorbs at the surface of the bubble helping to prevent bubble coalescence, and hence preserving the "low density particles". This is especially important when the bubbles are forced through the top valve.

Conventional froth flotation is attractive because the segregation velocity of the hydrophobic particles is governed by the rise velocity of the bubbles, and hence ultrafine particles less than 100 microns can be transported at very high rates regardless of their size. A second major attraction of froth flotation is the "de-sliming" that is achieved when the remaining suspension is allowed to drain back through the froth. Further, by adding wash water to the free-surface of the froth at the top the vessel, the suspension of hydrophilic particles can be washed away, producing a cleaner froth product.

But it is well known that the addition of wash water to the froth product is inefficient and non-uniform, and hence that the froth product is not as "clean" as might be preferred. If an excessive water addition rate is used there will be a strong tendency to create an opening in the froth resulting in the added water passing down through that opening producing little benefit. So water addition rates need to be limited to relatively low levels and need to be distributed uniformly.

A more efficient form of froth flotation can be achieved according to the present invention using the apparatus as described below with reference to FIG. 1. The apparatus comprises a chamber 1 having a substantially enclosed upper end 2 and a lower end 3 in which are located a set of parallel inclined channels 4. The parallel inclined channels are typically formed by the inclined sides 5 of the lower end 3 of the chamber 1 and a set of parallel inclined plates 6 located parallel to the inclined walls 5 so as to form the parallel inclined channels 4.

In this manner an inverted "reflux classifier" is formed in the chamber and operates according to the mechanism shown in FIG. 5 where the low density particles 7 escape the general flow 11, rising towards the downwardly facing inclined surface of the plate 6A, collecting as inverted sediment, and then sliding up the inclined channels as shown at 9.

The denser particles such as those typically shown at 10 fall out of the downward sediment movement 8 toward the upwardly facing inclined surface of the plates 6B and slide down the inclined channels.

Figure 2:
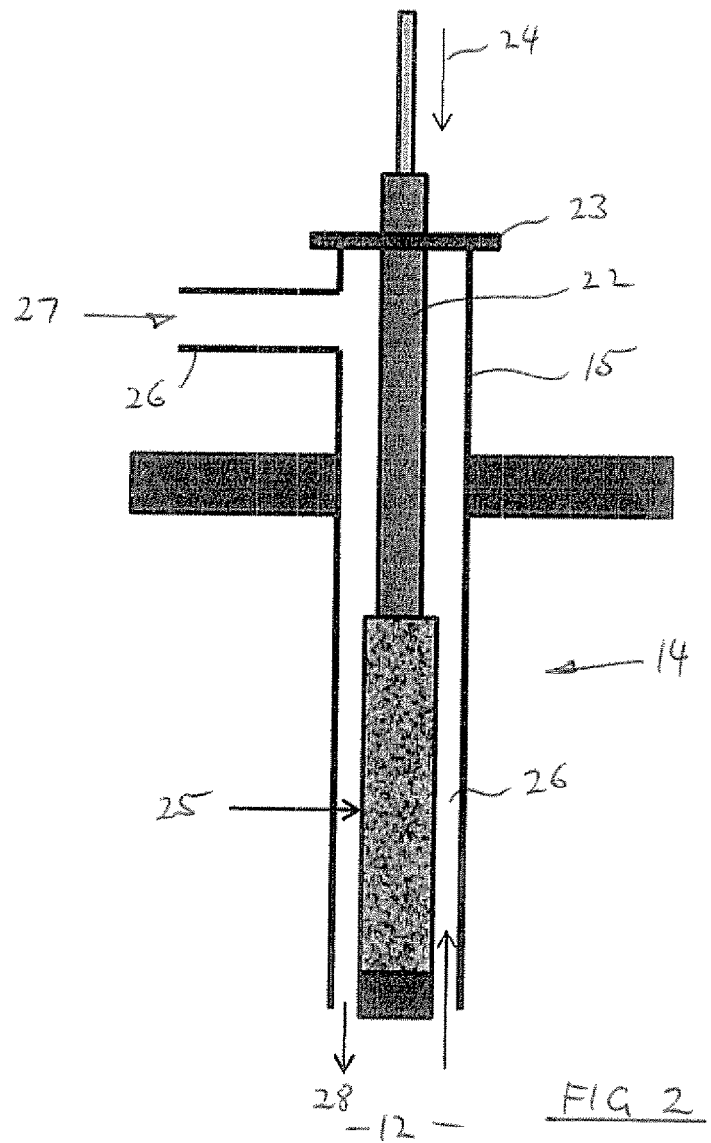
FIG. 2 is an enlarged view of a bubbly flow generator suitable for use in the apparatus shown in FIG. 1.

The feed slurry is introduced into the chamber at or about the mid-point as shown at 12 and those skilled in the art of froth flotation will appreciate that the feed to this device can be delivered in a variety of ways. One such way is the use of a vertical downcomer 14 which will be described in more detail with reference to FIG. 2.

The downcomer comprises a generally vertical pipe 15 with an internal tube 22 which may be mounted into the top end of the chamber by way of a flange 23. Gas, such as air, is introduced into the top end of the tube as shown by arrow 24 and passes down through the tube to a sparger section 25 located in the lower section of the pipe 15.

The particle suspension may be introduced through side inlet 26 as shown by arrow 27 where it passes down the pipe 15 to meet gas bubbles issuing from the sparger section 25. Because there is a relatively narrow annulus 26 between the sparger section 25 and the wall of the pipe 15, a high shear rate is introduced in the flow in the annulus 26 resulting in a well mixed bubbly flow issuing from the lower end of the downcomer at 28.

The upper end of the chamber 1 is shaped to direct the concentrated suspensions 16 of low density particles toward an upper outlet 13. This is typically achieved by shaping the upper end of the chamber as a cone 17 with the upper outlet 13 located at the apex of the cone as can be seen in FIG. 1.

The cone is preferably perforated so that wash water can be introduced into the upper end of the chamber at 18 under pressure and forced through perforations in the cone 17 in a uniform manner into the concentrated suspension 16 of low density particles. When the top of the froth is enclosed in this manner, which occurs when a fluidisation zone is used, the froth is fully contained, and lacks the degree of freedom to flow away from the added water. The froth is forced to engage with the wash water and distribute that wash water more evenly. Moreover, since the froth is only free to leave the system via a central overflow pipe 19 of small cross-section the froth is forced to accelerate towards the outlet 13 irrespective of the downwards wash water addition.

In the present invention the rising froth is forced to leave through a narrow opening in the top of the device. When a foam is forced through a constriction it tends to accelerate and to also stabilise. The froth emerging from the smaller opening will sometimes look more refined, with smaller size air bubbles. Given the increased transport velocity of the foam, any particle loss from a gas bubble interface is readily recovered by air bubbles rising upwards from below, hence hydrophobic particles should not tend to be lost from the froth product.

Moreover, in the present invention there is the opportunity to force much more wash water down through the top of the vessel. This has the effect of preventing froth from forming. In fact a fluidised bed of bubbles will tend to form, with significant quantities of clean water freely moving downwards between the rising air bubbles. Hence the hydrophilic particles can then be completely washed away. This is especially significant in applications involving large quantities of fine clays in the froth flotation of coal. The removal of these clays is a major challenge in the industry, especially with seams that carry high clay content. Unless these clays can be removed it becomes impossible to produce a clean product that meets the requirements of coal markets.

An inverted fluidised bed is arguably the only way to achieve the goal of high slimes removal in froth flotation. While inverted fluidised beds may have been used in the past to fluidise particles less dense than the fluid, they have not been used in the context of froth flotation, and have not been used to improve slimes removal during flotation.

The inverted fluidised bed is achieved in the present device by removing the "free surface" commonly seen in froth flotation devices. Free surfaces of this type make it difficult to efficiently engage the wash water without forming channels or holes in the froth.

At the base of the chamber 1 it is also possible to make provision for an additional fluidisation chamber 20. Fluidisation near the base provides a means for assisting particles that would otherwise settle onto the base of the vessel to discharge more easily through the outlet 29.

It is further noted that the vast majority of the volumetric flow would normally tend to discharge out the bottom of the vessel. Hence the system would operate effectively under dilute conditions, and hence there would be good distribution of this flow down all of the inclined channels. Higher system concentrations could still be used.

It is further noted that the device would operate effectively at feed and gas rates higher than used in a conventional froth flotation device, and would operate with higher wash water rates. These higher rates are made possible by the powerful effect of the inclined channels in the lower part of the system. These channels provide for an increase in the effective vessel area allowing gas bubbles that might otherwise be entrained downwards to the underflow to rise upwards towards the overflow.

In a further variation it is possible to make the gaps between the inclined channels at the exit of the inclined channels narrower. This would have the effect of increasing the pressure drop through the inclined channels and hence forcing a more even flow through each of the inclined channels. This reduction in the gap would best be formed by a taper so that there is no abrupt blockage of the sediment. The narrowing would only be in the bottom portion of the inclined channels.

An alternative arrangement shown in FIG. 3 is designed for high volumetric feed rates and low solids concentrations or low feed grades. In this arrangement, the feed slurry is fed into the chamber 1 through a feed box 30 which will be described in more detail below with reference to FIG. 4. The bubbly flow issues from the lower end 31 of the feed box 30 into the chamber 1 as previously described and the rising gas bubbles with attached hydrophobic particles rise upwardly on either side 32 of the feed box until they overflow the upper end of the chamber at 33 into a launder 34 for discharge as shown at 35.

Turning now to FIG. 4 it can be seen that the feed slurry introduced at 36 flows downwardly through a system of closely spaced parallel plates 37 which are aligned vertically as shown in FIG. 4, but which could be inclined if desired. The plates 37 are hollow and enclosed by a porous material. The gas supply shown diagrammatically at 38 is fed to the plate in a controlled manner such that fine bubbles in the order of 0.3 mm diameter will emerge from the porous sections of each plate and interact with the hydrophobic particles. Hydrophobic particles attached to the air bubbles are entrained downwards through the vertical channels 39 and then become entrained upwards through narrow passages 40 between the feed box 30 and the outer vessel wall 41. The bubbles and attached particles then progress to the product overflow launder 34 as shown in FIG. 3.

It will be appreciated that the embodiments of FIGS. 3 and 4 equally apply where the low density particles are oil drops within an emulsion, instead of gas bubbles within a bubbly mixture.

The advantage of a feed box as shown in FIG. 4 is that a precise laminar flow field is formed in each channel 39 as shown diagrammatically by the laminar flow profile 42. The laminar flow field has a high shear rate in the range $10 \text{ s}^{-1}$ to $1000 \text{ s}^{-1}$. This high shear rate is achieved by laminar flow as shown by the profile 42 which enables a high flow rate of bubbly mix to be achieved at the outlet from the feed box 30.

The objective is to recover all of the hydrophobic particles and, in this case, some entrained hydrophilic particles in the final product can be anticipated. In this arrangement it is not essential for foam to form. There are benefits in not having to maintain or control foam because foams can be highly variable in their stability.

Figure 6:
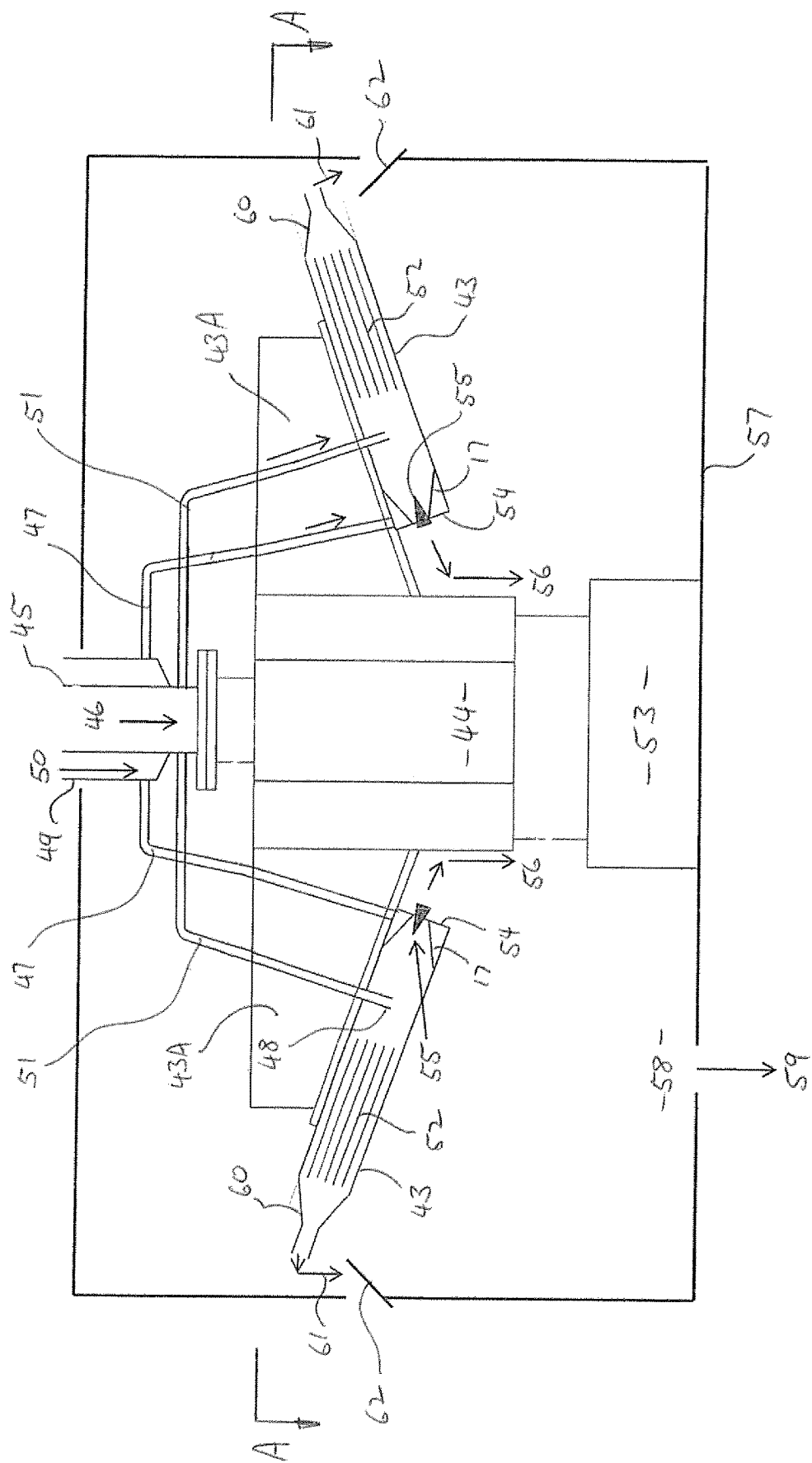
FIG. 6 is a diagrammatic cross-sectional elevation of apparatus for separating low density particles from feed slurries according to the invention when arranged in a centrifuge device to increase the rate of separation of low density particles.
Figure 7:
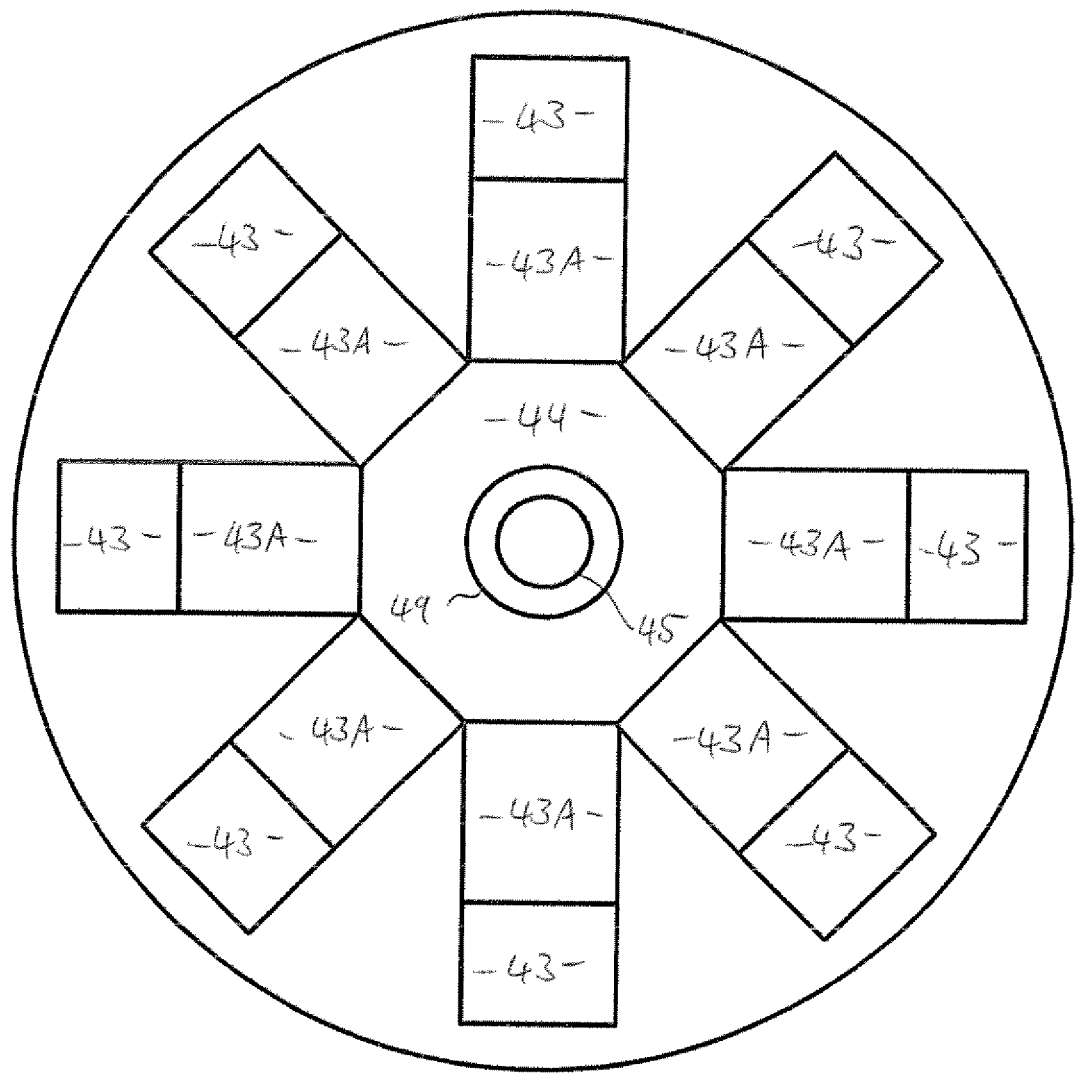
FIG. 7 is a diagrammatic cross-sectional plan view on the line AA of FIG. 6.

In a further enhancement of the invention, the rate of separation of low density particles (oil drops, hollow particles, bubbles, etc.) can be increased by subjecting an inverted reflux classifier of the type shown in either FIG. 1 or FIG. 3 to centrifical forces. This arrangement is shown in FIGS. 6 and 7.

A number of chambers of the type shown at 1 in either FIG. 1 or FIG. 3 can be arranged in a generally flat but inclined manner as shown at 43 supported by arms 43A extending radially outwardly from a central hub 44. Any suitable number of boxes 43 can be chosen but in the arrangement as clearly seen in FIG. 7 there are 8 boxes arrayed like the spokes of a wheel and extending outwardly from the octagonal hub 44.

The feed slurry is fed in through a central hollow shaft 45 as shown by arrow 46 from where it feeds outwardly through radial pipes 51 to entry points 48 in the boxes 43.

The fluidisation wash water can similarly be feed in through annulus 49 as shown by arrow 50 and hence through pipes 47 into the area at the head of each box 43 and hence outwardly through the perforated cones 17 arranged in a similar manner to that previously described with reference to FIG. 1.

Each inclined box 43 is provided with inclined channels 52 which act in a similar manner to the channels 4 shown in FIG. 1.

In practice, the device is rotated at a suitable speed about a bearing 53 to provide an enhanced gravitational field within the boxes 43 which are subjected to centrifical forces. The low density particles report to the inner ends 54 of the boxes 43 where they can be discharged through valves 55 and overflow downwardly as shown by arrows 56 to be collected in the bottom of a surrounding chamber 57 where they can be discharged through an outlet 58 as overflow at arrow 59.

The underflow containing hydrophilic particles more dense than the fluid reports to the outer ends 60 of the inclined boxes 43 where it is discharged at 61 and collected through an underflow chute 62.

The fluidisation water entering at 50 is used to help clean the low density product of so-called "slimes".

The parallel plates in the boxes 43 are typically aligned at an angle of 70° to the hub 44 and hence 20° to the centrifical force and are used to retain low density particles within the inner section of the device, allowing liquid and other contaminants, e.g. slimes, to discharge to the underflow via the outer section of the device.

By these means the present invention provides a new technology for recovering and concentrating low density particles, where the particle density is less dense than the fluid, for example water. The arrangement is shown in FIG. 1. In effect the Reflux Classifier is fully inverted, thus providing an upper fluidisation chamber 21 at the top of the device, connected to a vertical section, and then a section consisting of parallel inclined channels. At the very base there is the additional option of also including a fluidisation section in order to assist with the discharge of the slurry from the base and prevent build up of the denser particles that might also be present in the feed.

Thus what is proposed here is the concept of an inverted fluidised bed for separating particles, especially particles less dense than the fluid from particles more dense than the fluid. The inverted arrangement allows wash water to be added under pressure, allowing larger superficial velocities of wash water to be forced back down the zone of low density particles that concentrate in the upper vertical section of the device. The concentrated suspension of low density particles is then forced to move inwards at the top and in turn pass out through a central exit point. A valve 13 at the exit point controls the rate of discharge with reference to a measured suspension density in the upper vertical section.

The invention claimed is:

1. Apparatus for separating low density particles from feed slurries, said apparatus comprising: a separation chamber having an upper region, a lower region, a perforated upper end defining an upper boundary of the upper region, and a lower end defining a lower boundary of the lower region;

a wash water feeder arranged above the perforated upper end of the separation chamber, the wash water feeder fluidly communicating with the upper region of the separation chamber and being configured to force wash water under pressure through the perforated upper end and into the upper region of the separation chamber such that the wash water directly contacts the low density particles in the upper region of the separation chamber in the absence of a free surface between the low density particles in the upper region of the separation chamber and the perforated upper end;

a plurality of inclined channels located in the lower region of the separation chamber;

a conduit extending into the separation chamber, the conduit having an inlet end configured for receiving slurry and a discharge end for discharging a bubbly mixture into the separation chamber;

an inlet arranged to feed the gas into the conduit and being configured to allow the gas and the slurry to mix within the conduit and discharge as the bubbly mixture from the discharge end of the conduit;

the conduit being arranged and configured so that during operation of the apparatus, the bubbly mixture flows through the separation chamber and into the inclined channels such that the low density particles escape the downward bubbly mixture flow and slide up the downwardly facing inclined surfaces of the inclined channels while higher density particles in the bubbly mixture travel down the inclined channels;

a first outlet arranged in the separation chamber above the inclined channels and discharge end and being configured to allow concentrated suspensions of the low density particles to be removed from the separation chamber in a foam froth, and a second outlet arranged in the separation chamber below the inclined channels and being configured to allow the higher density particles to be removed from the separation chamber at a controlled rate;

wherein during operation of the apparatus, the bubbly mixture forms a fluidized bed of bubbles in the separation chamber above the inclined channels.

2. The apparatus of claim 1, wherein the conduit comprises at least one internal hollow tube communicating with the inlet and configured to receive the gas.

3. The apparatus of claim 2, wherein the at least one internal hollow tube comprises a porous surface.

4. The apparatus of claim 2, wherein the at least one internal hollow tube comprises a sparger structure.

5. The apparatus of claim 2, wherein the at least one internal hollow tube comprises a bottom end positioned within the conduit.

6. The apparatus of claim 2, wherein the at least one internal hollow tube is positioned axially within the conduit.

7. The apparatus of claim 2, wherein the at least one internal hollow tube has a top end and the inlet is provided at the top end.

8. The apparatus of claim 2, further comprising a sparger section positioned adjacent a bottom end of the at least one internal hollow tube.

9. The apparatus of claim 1, wherein said conduit comprises a downcomer.

10. The apparatus of claim 1, wherein the fluidized bed of bubbles in the separation chamber above the inclined channels comprises an inverted fluidized bed.

11. An apparatus for separating low density particles from feed slurries, said apparatus comprising:
a separation chamber having an upper region, a lower region, an upper end defining an upper boundary of the upper region, and a lower end defining a lower boundary of the lower region;
a plurality of inclined channels located in the lower region of the separation chamber;
a feed box having an upper feed end arranged to receive a slurry, a lower discharge end arranged to discharge a bubbly mixture into the separation chamber and a plurality of hollow porous parallel plates having an inlet end and an exit end;
a gas feeder arranged to feed gas into at least one of the hollow porous parallel plates so that the gas and a slurry discharge as the bubbly mixture from the discharge end of the feed box,
the feed box being configured so that the bubbly mixture flows through the separation chamber and into the inclined channels such that the low density particles escape the bubbly mixture flow and slide up the downwardly facing inclined surfaces of the inclined channels while higher density particles in the bubbly mixture travel down the channels;
at first outlet arranged in the separation chamber above the inclined channels and discharge end and being configured to allow the low density particles to be removed from the separation chamber, and
a second outlet arranged in the separation chamber below the inclined channels to allow the higher density particles to be removed from the separation chamber at a controlled rate,
wherein during operation of the apparatus, the bubbly mixture forms a fluidized bed of bubbles in the separation chamber above the inclined channels.

12. The apparatus of claim 1, wherein the discharge end of the conduit is located in the upper region of the separation chamber.

13. The apparatus of claim 1, wherein
the first outlet is arranged at the perforated upper end of the separation chamber and configured to allow removal of the concentrated suspensions of the low density particles.

14. The apparatus of claim 1, wherein the discharge end of the conduit is located proximate a mid-point of the separation chamber.

15. The apparatus of claim 1, wherein the inclined channels are arranged as parallel channels and are formed by a plurality of parallel plates.

16. The apparatus of claim 15 wherein the parallel channels are at an oblique angle relative to the downward flow of the bubbly mixture.

17. The apparatus of claim 1, wherein the upper perforated end is shaped to direct the concentrated suspensions of the low density particles toward the first outlet.

18. An assembly for separating low density particles from feed slurries, said assembly comprising a central hub and a plurality of apparatuses of claim 1, wherein the separation chambers of the plurality of apparatuses are arranged to extend radially outwardly from and rotate about the central hub forming an enhanced gravitational field within each separation chamber when rotated.

19. The apparatus of claim 10, wherein the wash water feeder is configured to form the inverted fluidized bed.

20. The apparatus of claim 1, wherein the perforated upper end which separates the wash water feeder from the upper region of the separation chamber.

21. The apparatus of claim 19, wherein the wash water feeder comprises perforations for supplying water or other fluid for supporting the formation of the inverted fluidized bed.

22. The apparatus of claim 10, wherein the perforated upper end of the separation chamber comprises perforations for supplying water or other fluid for supporting the formation of the inverted fluidized bed.

23. The apparatus of claim 1, wherein the perforated upper end is tapered such that it narrows towards the top of the apparatus.

24. The apparatus of claim 23, wherein the perforated upper end is shaped like a cone.

25. The apparatus of claim 11, wherein the fluidized bed of bubbles in the separation chamber above the inclined channels comprises an inverted fluidized bed.

26. The apparatus of claim 1, wherein a surface of the apparatus defining the lower region of the separation chamber is inclined or canted with respect to a surface of the apparatus defining the upper region of the separation chamber.

27. The apparatus of claim 1, wherein the conduit is surrounded by at least one of: the perforated upper end, the first outlet arranged at the perforated upper end of the separation chamber, and the wash water feeder.

28. The apparatus of claim 1, wherein the first outlet is defined between the perforated upper end and the conduit.

29. The apparatus of claim 1, wherein the first outlet is annular and is defined between the wash water feeder and the conduit.

30. The apparatus of claim 1, wherein the wash water feeder is configured to force wash water downwardly and/or radially through the perforated upper end and into the upper region of the separation chamber.

31. The apparatus of claim 1, wherein the separation chamber comprises open space extending between the discharge end of the conduit and the inclined channels, the open space being devoid of features such that the open space is configured for providing uninterrupted flow of the bubbly mixture towards the inclined channels.

32. The apparatus of claim 1, wherein the perforations in the perforated upper end are configured to uniformly deliver wash water from the wash water feeder to said concentrated suspensions of low density particles.

33. The apparatus of claim 26, wherein the surface of the lower region of the separation chamber defining the lower region extends at the same angle as the inclined channels.

34. The apparatus of claim 1, wherein the wash water feeder is adjacent the upper perforated end.

35. The apparatus of claim 1, wherein the wash water feeder and the upper perforated end share a common wall.

36. The apparatus of claim 1, wherein the wash water feeder is configured to force wash water in a uniform manner through the perforated upper end and into the upper region of the separation chamber.

37. The apparatus of claim 1, wherein the low density particles include at least one of hydrophobic particles, oil drops, hollow particles and gas bubbles.

38. The apparatus of claim 1, wherein the high density particles include hydrophilic particles.

39. The apparatus of claim 11, wherein the gas feeder feeds gas into the inlet end of the at least one of the hollow porous plates of the feed box.

40. Apparatus for separating low density particles from feed slurries, said apparatus comprising:
    a separation chamber having an upper region, a lower region, a perforated upper end defining an upper boundary of the upper region, and a lower end defining a lower boundary of the lower region;
    a wash water feeder arranged above the perforated upper end of the separation chamber, the wash water feeder being configured to force wash water under pressure through the perforated upper end and into the upper region of the separation chamber;
    a plurality of inclined channels located in the lower region of the separation chamber;
    a conduit extending into the separation chamber, the conduit having an inlet end configured for receiving slurry and a discharge end for discharging a bubbly mixture into the separation chamber;
    an inlet arranged to feed the gas into the conduit and being configured to allow the gas and the slurry to mix within the conduit and discharge as the bubbly mixture from the discharge end of the conduit;
    the conduit being arranged and configured so that during operation of the apparatus, the bubbly mixture flows through the separation chamber and into the inclined channels such that the low density particles escape the downward bubbly mixture flow and slide up the downwardly facing inclined surfaces of the inclined channels while higher density particles in the bubbly mixture travel down the inclined channels;
    a first outlet arranged in the separation chamber above the inclined channels and discharge end and being configured to allow concentrated suspensions of the low density particles to be removed from the separation chamber in a foam froth, and
    a second outlet arranged in the separation chamber below the inclined channels and being configured to allow the higher density particles to be removed from the separation chamber at a controlled rate;
    wherein during operation of the apparatus, the bubbly mixture forms a fluidized bed of bubbles in the separation chamber above the inclined channels; and
    wherein the wash water feeder is further configured to be in direct fluid communication with the bubbly mixture in the upper region, eliminating a free surface of the bubbly mixture, thereby introducing wash water directly to the concentrated suspension of low density particles before discharging as the foam froth.

41. Apparatus for separating low density particles from feed slurries, said apparatus comprising:
    a separation chamber having an upper region, a lower region, a perforated upper end defining an upper boundary of the upper region, and a lower end defining a lower boundary of the lower region;
    a wash water feeder arranged above the perforated upper end of the separation chamber, the wash water feeder being configured to force wash water under pressure through the perforated upper end and into the upper region of the separation chamber, such that the wash water directly engages the bubbly mixture in the absence of a free surface;
    a plurality of inclined channels located in the lower region of the separation chamber;
    a conduit extending into the separation chamber, the conduit having an inlet end configured for receiving slurry and a discharge end for discharging a bubbly mixture into the separation chamber;
    an inlet arranged to feed the gas into the conduit and being configured to allow the gas and the slurry to mix within the conduit and discharge as the bubbly mixture from the discharge end of the conduit;
    the conduit being arranged and configured so that during operation of the apparatus, the bubbly mixture flows through the separation chamber and into the inclined channels such that the low density particles escape the downward bubbly mixture flow and slide up the downwardly facing inclined surfaces of the inclined channels while higher density particles in the bubbly mixture move down the inclined channels;
    a first outlet arranged in the separation chamber above the inclined channels and discharge end and being configured to allow concentrated suspensions of the low density particles to be removed from the separation chamber in a foam froth, and
    a second outlet arranged in the separation chamber below the inclined channels and being configured to allow the higher density particles to be removed from the separation chamber at a controlled rate;
    wherein during operation of the apparatus, the bubbly mixture forms a fluidized bed of bubbles in the separation chamber above the inclined channels.

* * * * *